US009483761B2

(12) United States Patent
Brendell et al.

(10) Patent No.: US 9,483,761 B2
(45) Date of Patent: Nov. 1, 2016

(54) METHODS AND SYSTEMS FOR CONTACTLESS PAYMENTS AT A MERCHANT

(71) Applicant: III HOLDINGS 1, LLC, Wilmington, DE (US)

(72) Inventors: Brian Brendell, Springfield, NJ (US); I-Hsin Chuang, Brooklyn, NY (US); Carlos Korten, Brooklyn, NY (US); Nicole Lewis, New York, NY (US)

(73) Assignee: III Holdings 1, LLC, Wilmington, DE (US)

( * ) Notice: Subject to any disclaimer, the term of this patent is extended or adjusted under 35 U.S.C. 154(b) by 204 days.

(21) Appl. No.: 14/216,809

(22) Filed: Mar. 17, 2014

(65) Prior Publication Data
US 2014/0201085 A1 Jul. 17, 2014

Related U.S. Application Data

(63) Continuation of application No. 13/280,938, filed on Oct. 25, 2011, now Pat. No. 8,714,439, which is a continuation-in-part of application No. 13/215,145, filed on Aug. 22, 2011.

(51) Int. Cl.
*G06Q 40/00* (2012.01)
*G06Q 20/34* (2012.01)
(Continued)

(52) U.S. Cl.
CPC .......... *G06Q 20/352* (2013.01); *G06Q 20/202* (2013.01); *G06Q 20/325* (2013.01); *G06Q 20/3276* (2013.01); *G06Q 20/3278* (2013.01);
(Continued)

(58) Field of Classification Search
USPC ........................................ 235/375, 379, 380
See application file for complete search history.

(56) References Cited

U.S. PATENT DOCUMENTS 6,075,895 A 6/2000 Qiao et al.
6,098,053 A 8/2000 Slater
(Continued)

FOREIGN PATENT DOCUMENTS

WO 2007033358 3/2007

OTHER PUBLICATIONS

Advisory Action dated Apr. 8, 2014 in U.S. Appl. No. 13/619,391.
(Continued)

*Primary Examiner* — Michael G Lee
*Assistant Examiner* — Tabitha Chedekel
(74) *Attorney, Agent, or Firm* — Meyertons, Hood, Kivlin, Kowert & Goetzel, P.C.

(57) ABSTRACT

A coordination server of a contactless payment system may receive a total bill of purchases for a customer from a merchant point-of-sale terminal, associate the total bill of purchases with a unique identifier of an RFID tag of a check presenter, and receive notification that payment of the total bill of purchases is authorized. The coordination server may receive the unique identifier and payment information from a contactless-enabled device, and transmit the payment information and the total bill to the merchant point-of-sale terminal for transmittal to a merchant acquirer for completion of the transaction under business as usual standards. In one embodiment, the coordination server transmits the payment information and the total bill to a merchant acquirer, which then routes the payment request to an appropriate payment network. In another embodiment, the coordination server transmits the payment information and the total bill directly to the appropriate payment network.

16 Claims, 13 Drawing Sheets

(51) Int. Cl.
*G06Q 20/32* (2012.01)
*G06Q 20/42* (2012.01)
*G06Q 20/20* (2012.01)
*G06Q 20/38* (2012.01)
*G06Q 20/40* (2012.01)

(52) U.S. Cl.
CPC ............ *G06Q 20/382* (2013.01); *G06Q 20/40* (2013.01); *G06Q 20/425* (2013.01)

(56) References Cited

U.S. PATENT DOCUMENTS

| | | |
|---|---|---|
| 6,421,453 B1 | 7/2002 | Kanevsky et al. |
| 6,509,707 B2 | 1/2003 | Yamashita et al. |
| 6,533,168 B1 | 3/2003 | Ching |
| 6,788,809 B1 | 9/2004 | Grzeszczuk et al. |
| 7,308,112 B2 | 12/2007 | Fujimura et al. |
| 7,365,735 B2 | 4/2008 | Reinhardt et al. |
| 7,365,737 B2 | 4/2008 | Marvit et al. |
| 7,394,346 B2 | 7/2008 | Bodin |
| 7,457,767 B1 | 11/2008 | Dunsmore et al. |
| 7,595,816 B1 | 9/2009 | Enright et al. |
| 7,746,215 B1 * | 6/2010 | Bishop .................. G06Q 20/04 235/380 |
| 7,775,440 B2 | 8/2010 | Silverbrook et al. |
| 7,894,634 B2 | 2/2011 | Chung |
| 7,971,784 B2 | 7/2011 | Lapstun et al. |
| 8,028,896 B2 | 10/2011 | Carter et al. |
| 8,172,135 B1 | 5/2012 | Aidasani et al. |
| 8,181,858 B2 | 5/2012 | Carter et al. |
| 8,468,584 B1 | 6/2013 | Hansen |
| 8,705,081 B2 | 4/2014 | Mitsutake et al. |
| 2003/0132974 A1 | 7/2003 | Bodin |
| 2004/0078329 A1 | 4/2004 | Kight et al. |
| 2004/0093308 A1 | 5/2004 | Kawashima et al. |
| 2005/0044042 A1 | 2/2005 | Mendiola et al. |
| 2005/0097320 A1 | 5/2005 | Golan et al. |
| 2005/0171776 A1 | 8/2005 | Kojima et al. |
| 2006/0094399 A1 | 5/2006 | Dupont |
| 2006/0144946 A1 | 7/2006 | Kuriyama et al. |
| 2006/0200480 A1 | 9/2006 | Harris et al. |
| 2006/0215821 A1 | 9/2006 | Rokusek et al. |
| 2007/0055630 A1 | 3/2007 | Gauthier et al. |
| 2007/0075968 A1 | 4/2007 | Hall et al. |
| 2007/0152035 A1 | 7/2007 | Adams et al. |
| 2007/0252898 A1 | 11/2007 | Delean |
| 2008/0000117 A1 | 1/2008 | Marshall et al. |
| 2008/0167017 A1 | 7/2008 | Wentker et al. |
| 2008/0222048 A1 | 9/2008 | Higgins et al. |
| 2009/0006646 A1 | 1/2009 | Duarte |
| 2009/0108057 A1 | 4/2009 | Mu et al. |
| 2009/0265671 A1 | 10/2009 | Sachs et al. |
| 2010/0008535 A1 | 1/2010 | Abulafia et al. |
| 2010/0111377 A1 | 5/2010 | Monroe |
| 2010/0121725 A1 | 5/2010 | Adams et al. |
| 2010/0131273 A1 | 5/2010 | Aley-Raz et al. |
| 2010/0203870 A1 | 8/2010 | Hubinak et al. |
| 2010/0216396 A1 | 8/2010 | Fernandez et al. |
| 2010/0256827 A1 | 10/2010 | Bragg et al. |
| 2011/0093821 A1 | 4/2011 | Wigdor et al. |
| 2011/0098023 A1 | 4/2011 | Hammad |
| 2011/0112920 A1 | 5/2011 | Mestre et al. |
| 2011/0155800 A1 | 6/2011 | Mastrangelo et al. |
| 2011/0161229 A1 | 6/2011 | Mastrangelo et al. |
| 2011/0166997 A1 | 7/2011 | Dixon et al. |
| 2011/0184821 A1 | 7/2011 | Mon et al. |
| 2011/0184867 A1 | 7/2011 | Varadarajan |
| 2011/0220718 A1 | 9/2011 | Dixon et al. |
| 2011/0251892 A1 | 10/2011 | Laracey |
| 2011/0251954 A1 | 10/2011 | Chin |
| 2011/0263292 A1 | 10/2011 | Phillips |
| 2011/0270757 A1 | 11/2011 | Hammad |
| 2011/0282785 A1 | 11/2011 | Chin |
| 2011/0307318 A1 | 12/2011 | LaPorte et al. |
| 2012/0030195 A1 | 2/2012 | Holt et al. |
| 2012/0136780 A1 | 5/2012 | El-Awady et al. |
| 2012/0151380 A1 | 6/2012 | Bishop |
| 2012/0158528 A1 | 6/2012 | Hsu et al. |
| 2012/0166314 A1 | 6/2012 | Kimberg |
| 2012/0173325 A1 | 7/2012 | Johri |
| 2012/0173396 A1 | 7/2012 | Melby et al. |
| 2012/0200389 A1 | 8/2012 | Solomon |
| 2012/0203666 A1 | 8/2012 | Torossian et al. |
| 2012/0209749 A1 | 8/2012 | Hammad et al. |
| 2012/0280040 A1 | 11/2012 | Carney et al. |
| 2012/0307109 A1 | 12/2012 | Morioka et al. |

OTHER PUBLICATIONS

Advisory Action dated Mar. 3, 2014 in U.S. Appl. No. 13/215,115.
Final Office Action dated Mar. 6, 2014 in U.S. Appl. No. 13/168,850.
Final Office Action dated Mar. 14, 2014 in U.S. Appl. No. 13/619,391.
Restriction Requirement dated Apr. 7, 2014 in U.S. Appl. No. 13/215,145.
Advisory Action dated Apr. 7, 2014 in U.S. Appl. No. 13/168,850.
Card.io—How it works, 1 page, www.card.io, 2012.
Office Action dated Nov. 22, 2011 in U.S. Appl. No. 13/168,072.
Office Action dated Jan. 5, 2012 in U.S. Appl. No. 13/168,835.
Notice of Allowance dated Feb. 15, 2012 in U.S. Appl. No. 13/168,835.
Office Action dated Nov. 22, 2011 in U.S. Appl. No. 13/168,830.
Notice of Allowance dated Mar. 8, 2012 in U.S. Appl. No. 13/168,830.
Office Action dated Nov. 22, 2011 in U.S. Appl. No. 13/168,837.
Notice of Allowance dated Feb. 13, 2012 in U.S. Appl. No. 13/168,837.
Office Action dated Nov. 29, 2011 in U.S. Appl. No. 13/168,843.
Notice of Allowance dated Feb. 13, 2012 in U.S. Appl. No. 13/168,843.
Perez, Taking on Rival Jumio, Payments Startup Card.io Adds Web Suuport, pp. 1-2, www.techcrunch.com, Mar. 22, 2012.
Office Action dated Jun. 28, 2012 in U.S. Appl. No. 13/168,807.
Office Action dated Jul. 10, 2012 in U.S. Appl. No. 13/168,829.
Office Action dated Aug. 30, 2012 in U.S. Appl. No. 13/168,850.
Office Action dated Oct. 15, 2012 in U.S. Appl. No. 13/619,391.
Final Office Action dated Nov. 30, 2012 in U.S. Appl. No. 13/168,829.
Office Action dated May 26, 2011 in U.S. Appl. No. 12/343,178.
Final Office Action dated Dec. 14, 2012 in U.S. Appl. No. 13/168,807.
Final Office Action dated Dec. 20, 2012 in U.S. Appl. No. 13/168,850.
Perez, Cardio Lets You Pay on Mobile by Holding a Credit Card Up to the Phone, pp. 1-2, www.readwriteweb.com, Jun. 23, 2011.
Office Action dated Jan. 29, 2013 in U.S. Appl. No. 13/168,823.
Advisory Action dated Feb. 11, 2013 in U.S. Appl. No. 13/168,829.
Advisory Action dated Feb. 13, 2013 in U.S. Appl. No. 13/168,807.
Office Action dated Feb. 14, 2013 in U.S. Appl. No. 13/619,131.
Advisory Action dated Mar. 1, 2013 in U.S. Appl. No. 13/168,850.
Office Action dated Mar. 13, 2013 in U.S. Appl. No. 13/168,829.
Office Action dated Jun. 8, 2012 in U.S. Appl. No. 12/343,178.
Final Office Action dated Apr. 1, 2013 in U.S. Appl. No. 13/619,391.
Office Action dated Apr. 26, 2013 in U.S. Appl. No. 13/168,850.
Final Office Action dated Apr. 26, 2013 in U.S. Appl. No. 13/168,823.
Notice of Allowance dated May 10, 2013 in U.S. Appl. No. 13/168,829.
Office Action dated May 10, 2013 in U.S. Appl. No. 13/168,827.
Final Office Action dated Jun. 11, 2013 in U.S. Appl. No. 13/619,131.
Advisory Action dated Jun. 14, 2013 in U.S. Appl. No. 13/619,391.
Office Action dated Dec. 24, 2012 in U.S. Appl. No. 12/343,178.
Advisory Action dated Jun. 27, 2013 in U.S. Appl. No. 13/168,823.
Office Action dated Aug. 1, 2013 in U.S. Appl. No. 13/619,391.
Advisory Action dated Aug. 22, 2013 in U.S. Appl. No. 13/619,131.

(56) References Cited

OTHER PUBLICATIONS

Final Office Action dated Aug. 23, 2013 in U.S. Appl. No. 13/168,827.
Office Action dated Aug. 27, 2013 in U.S. Appl. No. 13/215,115.
Office Action dated Sep. 6, 2013 in U.S. Appl. No. 13/619,131.
Office Action dated Sep. 9, 2013 in U.S. Appl. No. 13/168,807.
Office Action dated Sep. 17, 2013 in U.S. Appl. No. 13/168,850.
Notice of Allowance dated Sep. 23, 2013 in U.S. Appl. No. 13/619,131.
Advisory Action dated Oct. 25, 2013 in U.S. Appl. No. 13/168,827.
Office Action dated Dec. 5, 2012 in U.S. Appl. No. 13/280,938.
Final Office Action dated Mar. 29, 2013 in U.S. Appl. No. 13/280,938.
Office Action dated Jun. 27, 2013 in U.S. Appl. No. 13/280,938.
Final Office Action dated Jan. 16, 2014 in U.S. Appl. No. 13/280,938.
Notice of Allowance dated Jan. 31, 2014 in U.S. Appl. No. 13/280,938.
Office Action in U.S. Appl. No. 13/215,145 mailed Aug. 28, 2014, 10 pages.

* cited by examiner

METHODS AND SYSTEMS FOR CONTACTLESS PAYMENTS AT A MERCHANT

CROSS REFERENCE TO RELATED APPLICATIONS

This application is a continuation of, claims priority to and the benefit of, U.S. Ser. No. 13/280,938 filed Oct. 25, 2011 and entitled "METHODS AND SYSTEMS FOR CONTACTLESS PAYMENTS AT A MERCHANT." The '938 application is a continuation-in-part application of U.S. application Ser. No. 13/215,145, entitled "METHODS AND SYSTEMS FOR CONTACTLESS PAYMENTS," which was filed on Aug. 22, 2011. Both of which are hereby incorporated by reference in their entirety.

FIELD

The present disclosure generally relates to contactless payments in a retail environment. More particularly, the present disclosure relates to methods, systems and computer program products for contactless payments at a restaurant merchant.

BACKGROUND OF THE DISCLOSURE

In a typical merchant transaction at a restaurant, a consumer receives a bill at the end of the dining experience and submits a form of payment. The form of payment may be cash, check, debit card, charge card or credit card. If a debit card or credit card is provided by the consumer, an employee takes the card to a point-of-sale terminal and processes the card to obtain authorization for receiving payment for the bill. The point-of-sale terminal is generally out of sight from the consumer and it takes a period of time for the employee to process the card. The consumer may be concerned that the employee is retaining credit card information while out of sight.

Furthermore, it is very common for a group of consumers to decide to pay for only a portion of the total bill. The restaurant employee may divide the total bill into multiple bills for people to pay, though this takes additional time for the employee and increases the chance of making a mistake on the bill. Alternatively, the restaurant employee may only provide a total bill, and then process various amounts on multiple cards in order to satisfy payment. Again, dividing payment of a total bill amongst multiple cards increases the risk of a mistake.

In light of the foregoing, there exists a need for a system, method and/or computer program product that provides a consumer the security of maintaining physical possession of a credit card, increases efficiency of a restaurant by lowering bill payment wait times, and decreases the chances of a billing mistake when multiple funding sources are used to satisfy payment.

SUMMARY

In various embodiments, a contactless payment system for merchant transactions (e.g., a restaurant), comprises generating, at the contactless payment system, a total bill of purchases associated with a consumer, associating a unique identifier of a radio frequency identification (RFID) tag with the total bill, transmitting the total bill and associated unique identifier to a consumer accessible payment network, and receiving payment from the consumer for satisfaction of the total bill. The consumer may submit the payment using a contactless-enabled device, such as a smartphone for example. The contactless-enabled device may interrogate the RFID tag to receive the unique identifier and a payment network link. Furthermore, the contactless-enabled device may submit a payment transaction request to the payment network, where the payment transaction request includes the unique identifier and an account identifier. Additionally, the payment network receives the payment transaction request and locates the total bill using the unique identifier as a key. In various embodiments, the RFID tag is replaced with (or used in addition to) a QR code.

In various embodiments, a coordination server of a contactless payment system performs operations comprising receiving, at the coordination server, a total bill of purchases for a customer from a merchant point-of-sale terminal, associating the total bill of purchases with a unique identifier of a radio frequency identification tag of a check presenter, and receiving notification that payment of the total bill of purchases is authorized. Additionally, the coordination server may act as the primary coordination point for dividing a bill of sale and ensuring that all partial payments by customers satisfy the total outstanding bill. The coordination server may be integrated into the merchant point-of-sale terminal, or the coordination server may be separate from the merchant point-of-sale terminal. In other embodiments, the coordination server may reside at the merchant's location, or at an issuer facility.

Furthermore, in various embodiments, the coordination server receives the unique identifier of the RFID tag and payment information from a contactless-enabled device. The total bill may be located using the unique identifier as a key, and the coordination server transmits the payment information and the total bill to the merchant point-of-sale terminal. The merchant point-of-sale terminal may be configured to transmit the payment information and the total bill to a merchant acquirer for completion of the transaction under business as usual standards.

In various other embodiments, the coordination server receives the unique identifier of the RFID tag and payment information from a contactless-enabled device, locates the total bill using the unique identifier as a key, and transmits the payment information and the total bill to a merchant acquirer, which then routes the payment request to an appropriate payment network. The appropriate payment network is selected based on the payment information from the contactless-enabled device. In another embodiment, the coordination server transmits the payment information and the total bill directly to the appropriate payment network.

To help facilitate the contactless merchant transaction, an exemplary check presenter apparatus may be used. The check presenter apparatus may include a radio frequency identifier (RFID) tag with a unique identifier, where the unique identifier is associated with a total bill at a coordination server. A contactless-enabled device in proximity to the check presenter apparatus may read the unique identifier from the RFID tag, and transmit payment information and the unique identifier to facilitate contactless payment of the total bill. In various embodiments, the check presenter apparatus comprises a quick response (QR) code with a unique identifier, where the unique identifier is associated with a total bill at the coordination server. The contactless-enabled device in proximity to the check presenter apparatus may read the unique identifier from the QR code, and transmit payment information and the unique identifier to facilitate contactless payment of the total bill.

BRIEF DESCRIPTION OF THE DRAWINGS

The features and advantages of the present disclosure will become more apparent from the detailed description set forth below when taken in conjunction with the drawings, in which like reference numbers indicate identical or functionally similar elements. Additionally, the left-most digit of a reference number identifies the drawing in which the reference number first appears.

DETAILED DESCRIPTION

Figure 1:
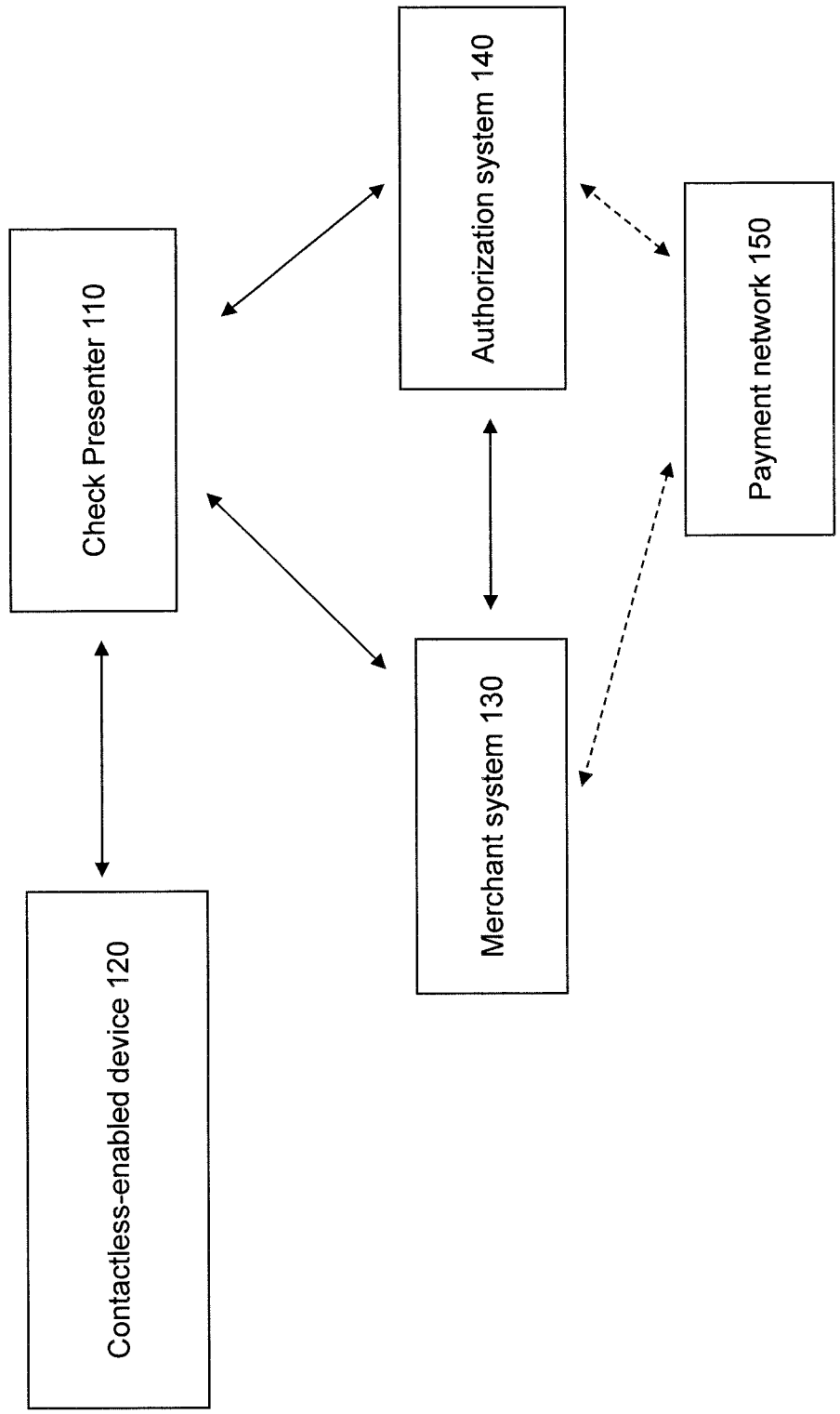
FIG. 1 is an overview of an exemplary system for conducting contactless payments in a merchant transaction environment.

In various embodiments, a system, method and/or computer program product for conducting a contactless merchant transaction is disclosed. Although these exemplary embodiments may be used in different merchant environments, the embodiments discussed herein will be described as an example with respect to a restaurant environment, though not limited to such. FIG. 1 is an overview of an exemplary system 100 for conducting a contactless restaurant transaction. In various embodiments, system 100 comprises a check presenter having a radio frequency identification (RFID) tag 110, a contactless-enabled device 120 having consumer information, a merchant system 130, and an authorization system 140. The check presenter with RFID tag 110 may be a standard check presenter, typically a small black bi-fold holder, which includes an RFID tag. Furthermore, the RFID tag may be internal to the check presenter 110 or may be removably coupled to the check presenter 110. The RFID tag may be a passive tag that is powered by a nearby reader, such as the contactless-enabled device 120. In various embodiments, the check presenter 110 is a tablet computer operated primary by a touch screen, such as an iPad. Authorization system 140 may include any entity that offers transaction account services, such as a financial institution.

In various embodiments, system 100 further comprises a payment network 150. The payment network 150 facilitates receiving payment authorization from one or more authorization systems 140, and providing notifications to merchant system 130. In various embodiments, payment network 150 may be a stand-alone network separate from merchant system 130 and authorization system 140. Furthermore, in various embodiments, payment network 150 may be a part of merchant system 130 or a part of authorization system 140. Payment network 150 is a central network which communicates with various systems and may communicate with contactless-enabled devices 120. Payment network 150 may be a proprietary network operated by merchant system 130 or authorization system 140. Moreover, payment network 150 may be operated by a third party provider and may be associated with multiple merchant systems 130 and/or multiple authorization systems 140.

Merchant system 130 may comprise any type of hardware and/or software (e.g., a computer server) configured or configurable to generate and/or display an invoice for services provided or goods purchased. In various embodiments, merchant system 130 generates the total bill at the end of a meal in a restaurant. In exemplary embodiments, each check presenter with RFID tag 110 has a unique identifier. The merchant system 130 then associates the total bill with the unique identifier of the RFID tag 110. Merchant system 130 loads the total bill and unique identifier onto a network accessible by the consumer. The accessible network may be a website operated by the merchant system 130 or a website operated by a third party. The merchant system 130 may load the total bill to the appropriate check presenter using the unique identifier. The unique identifier also helps the merchant system 130 track receipt of payment for separate bills.

The system 100 may include or interface with any of the foregoing accounts or devices, a contactless-enabled device 120 (e.g., an RF device) and RFID tag in communication with the contactless-enabled device 120 (which may include a fob), or communications between an initiator and a target enabled by near field communications (NFC). Typical contactless-enabled devices 120 may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

Figure 2:
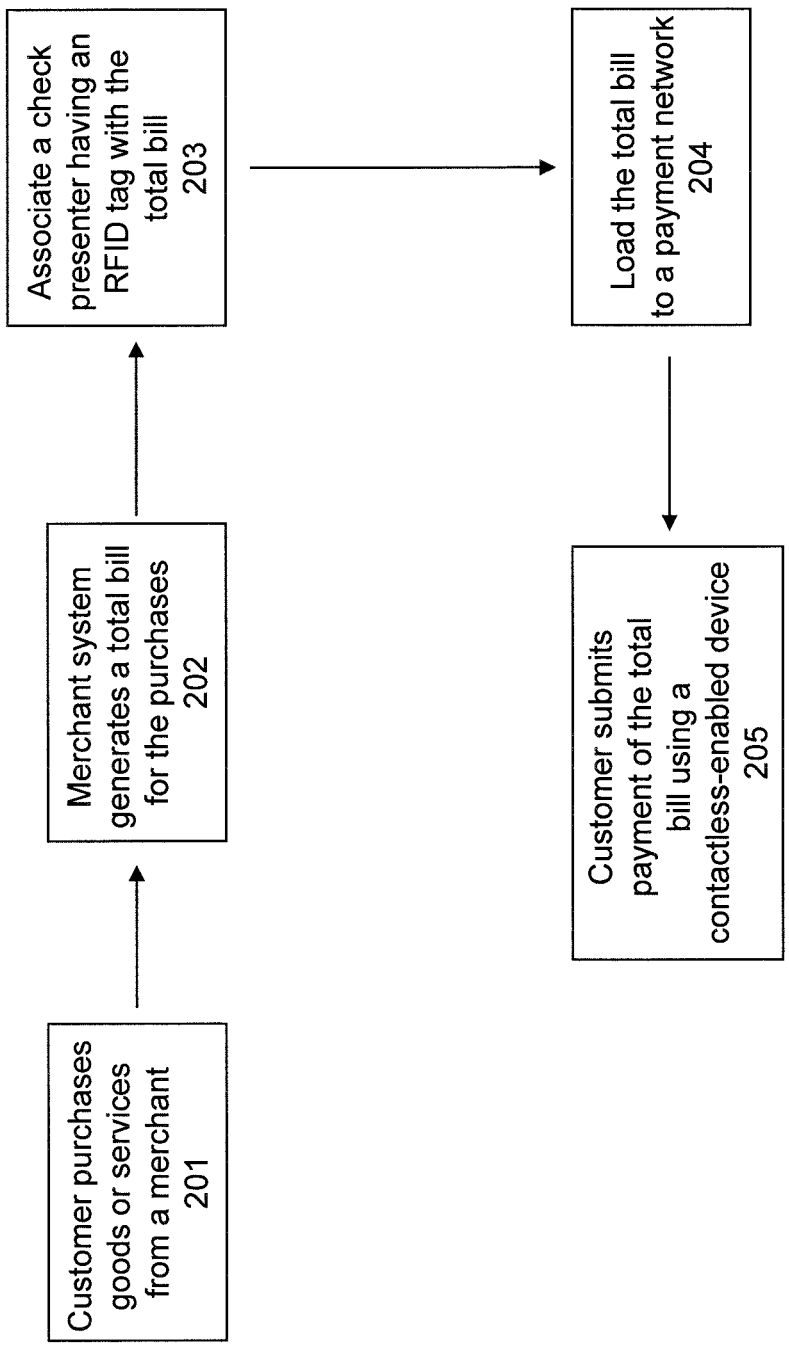
FIG. 2 is a flowchart illustrating one exemplary process of conducting contactless payments in a merchant transaction environment.

With reference to FIG. 2, an exemplary method may include the following steps. Once a consumer finishes ordering items from a restaurant 201, the total bill of the items purchased during the dining experience may be generated by a merchant system 202. The merchant system associates an RFID tag with the total bill 203, and then loads the total bill onto a consumer accessible payment network 204. Each RFID tag may have a unique identifier, such as a serial number, which is used to associate the RFID tag with the bill. The check presenter is given to the consumer, who has multiple options to pay the total bill. The options include cash, check, providing a transaction account card, or submitting payment using a contactless-enabled device 205.

Figure 3:
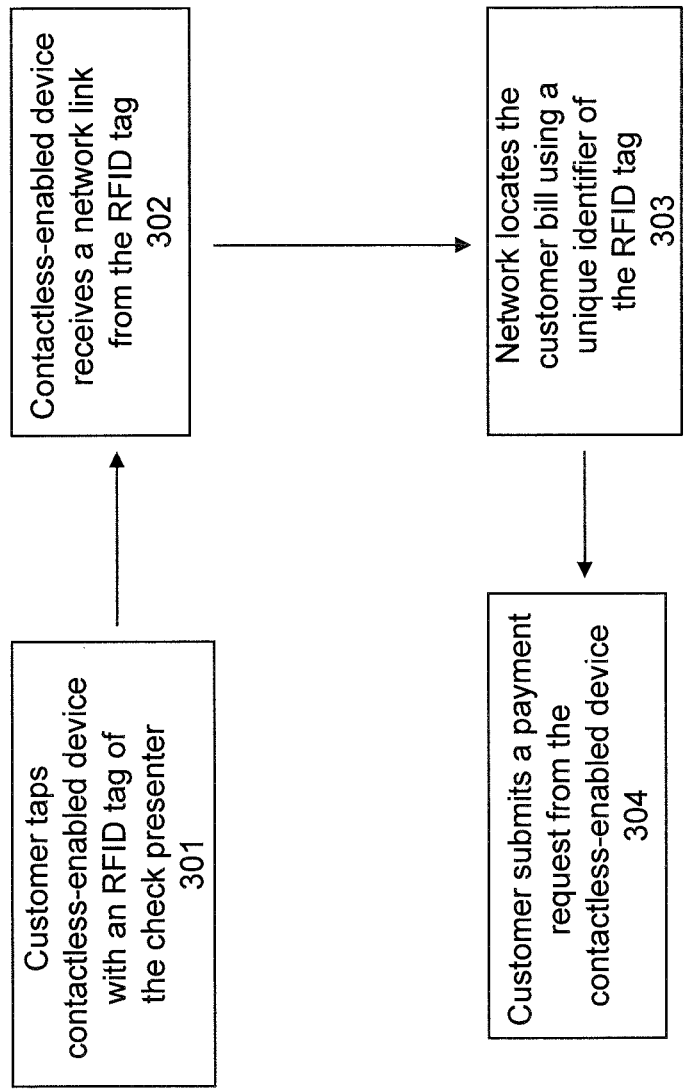
FIG. 3 is an embodiment of a process of conducting contactless payments in a merchant transaction environment using an RFID tag.

With reference to FIG. 3, in order to submit payment using the contactless-enabled device, the consumer may provide account information by "tapping" the contactless-enabled device 120 with check presenter having the RFID tag 110 (step 301). The "tapping" motion means placing the contactless-enabled device 120 in close proximity to the RFID tag in order for an RF transponder of the contactless-enabled device 120 to communicate. This may include physically touching the contactless-enabled device 120 to the RFID tag, or at least placing the contactless-enabled device 120 in close enough proximity to enable an interrogation signal to power the RFID tag and receive the unique identifier and a link to an accessible network (step 302). In various embodiments, the contactless-enabled device 120 accesses the network using the received link. The unique identifier is provided by the contactless-enabled device to the network, where the unique identifier is used as a key to locate the consumer's bill (step 303). Once the total bill is retrieved, the consumer may submit a payment request to an authorization system using the contactless-enabled device 120 (step 304).

Figure 4:
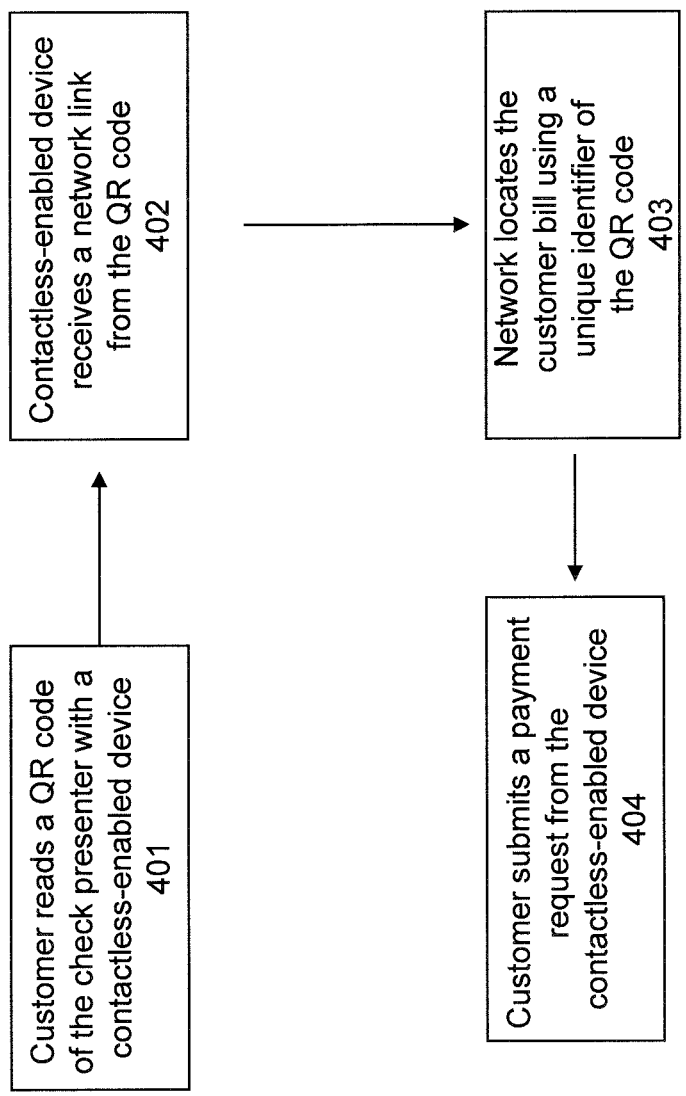
FIG. 4 is an embodiment of a process of conducting contactless payments in a merchant transaction environment using a QR code.

In various embodiments and with reference to FIG. 4, check presenter 110 includes a Quick Response (QR) code in place of, or in addition to, an RFID tag. With the QR code, the contactless-enabled device 120 does not need to be an RF-enabled device, but instead only needs a camera and the appropriate software to "read" the QR code (step 401). The QR code may link the contactless-enabled device 120 to a website where the appropriate payment may be made to the restaurant bill (step 402). A part of the information provided by reading the QR code may include a unique identifier associated with the total bill (step 403). In using a QR code to generate contactless payments, the merchant system 130 provides the total bill to the payment website prior to the contactless-enabled device 120 linking to the total bill. The payment website may be operated by the merchant system 130 or by a third party entity. Once the total bill is retrieved, the consumer may submit a payment request to an authorization system using the contactless-enabled device 120 (step 404).

In various exemplary embodiments, whether the contactless-enabled device 120 accesses the total bill via an RFID tag or a QR code, a consumer is able to pay the total bill using account information stored on the contactless-enabled device 120. Furthermore, the contactless-enabled device 120 may store multiple accounts which the consumer may select from to make the payment. In exemplary embodiment, the contactless-enabled device 120 is a smart phone with a graphical user interface. Moreover, the consumer accesses the total bill and is able to add a tip if desired. The consumer selects which account is to be used and then proceeds to submit payment similar to an online transaction. For additional information regarding contactless payments in an online transaction, please see U.S. application Ser. No. 13/215,111, entitled "METHODS AND SYSTEMS FOR CONTACTLESS PAYMENTS FOR ONLINE ECOMMERCE CHECKOUT," filed on Aug. 22, 2011, which is incorporated by reference.

In various embodiments, a check presenter includes a smart RFID tag instead of, or in addition to, a passive RFID tag. The smart RFID tag may be configured to store one or more of a unique identifier, a transaction identifier, and transaction information. The transaction information, for example, may include the amount due and merchant information. In the various embodiments, this additional information allows a consumer to pay the total bill using a financial institution of the consumer's choosing. For example, the consumer can provide the information to a personal bank, where the bank receives the amount due and the merchant information, along with a consumer identifier. Once the consumer is identified and verified, the bank may approve the transaction and submit payment of the amount due to the merchant of record as indicated by the merchant information. Such a transaction has additional security in that the consumer's account number is never transmitted during the processing.

In various embodiments, the manner in which the contactless-enabled device 120, (having an RF transponder) is tapped corresponds to different information on the contactless-enabled device 120. The contactless-enabled device 120 may be "tapped" with an active RFID tag by waving the contactless-enabled device in close proximity, where the waving with a gesture formation is an identifier. For example, waving the contactless-enabled device with a gesture formation in the form of a circular shape may result in the population of the online transaction fields using a first set of data. Likewise, waving the contactless-enabled device with a gesture formation in the form of a square yields similar results and population of the online transaction fields using a second set of data. For example, the first set of data may be the account information of the consumer's American Express credit card. The second set of data may be the account information of the consumer's Visa credit card. In another example, the first set of data may contain the consumer's home address as the shipping address, whereas the second set of data may contain the consumer's work address as the shipping address. For more information regarding a gesture formation identifier, refer to U.S. patent application Ser. No. 13/168,072, entitled "SYSTEMS AND METHODS FOR GESTURE-BASED INTERACTION WITH COMPUTER SYSTEMS," filed Jun. 24, 2011, which is hereby incorporated by reference.

In addition to a gesture being an identifier a voice activated phrase may also be an identifier. In various embodiments, a consumer may have to speak a specific phrase into the RF device to unlock the ability to initiate a transaction. Each phrase may be linked to account information. Speaking the specific phrase unlocks the contactless-enabled device so that the contactless-enabled device and stored information is available next time the contactless-enabled device is tapped or a QR code accessed. This unlocking phrase increases the device security and prevents the contactless-enabled device from transmitting information unintentionally or if an unauthorized reader is attempting to access the information. Furthermore, the device security may be enhanced by requiring that it is the consumer's voice that speaks the phrase.

Figure 5:
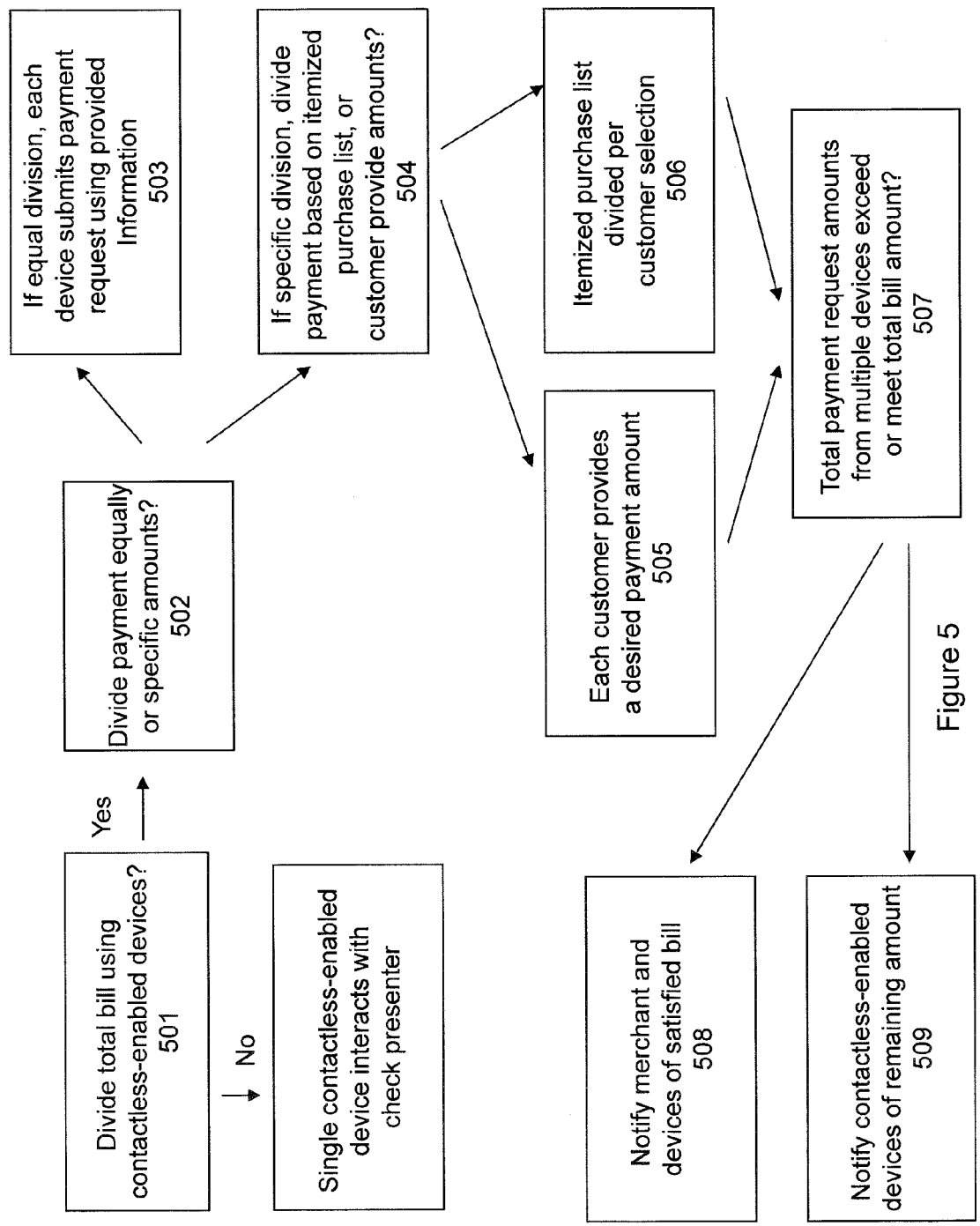
FIG. 5 is a flowchart illustrating an exemplary process of dividing payment of a payment among multiple contactless-enabled devices in a merchant transaction environment.

As is common with groups of people dining together at a restaurant, the total bill may be divided amongst individuals or sub-groups of people. As stated earlier, dividing the total bill takes additional time and presents the opportunity for a mistake to be made. In accordance with various exemplary embodiments and with reference to FIG. 5, one or more contactless-enabled devices 120 may be used to help divide the total bill in any way desired (step 501). One such embodiment involves multiple contactless-enabled devices 120 each tapping the check presenter having the RFID tag 110, where the RFID tag is an active tag. The merchant system 130 or a third party entity operating the payment website may be given notice that the total bill will be divided among consumers. The notice may be given in various ways, including pressing a button on the check presenter. The button may be pressed a certain number of times, each press indicating the number of people splitting the total bill. For example, if three consumers decide to divide the total bill, then the button is pressed three times. Each of the three consumers must then tap their respective contactless-enabled devices 120 with the check presenter with RFID tag 110. In various embodiments, the three contactless-enabled devices 120 of the consumers are tapped within a certain amount of time, such as one minute. If the indicated number of contactless-enabled devices are not presented within the specified amount of time, the payment transaction may be cancelled and the payment process restarted. In various embodiments, the notice of multiple payors may be given to the merchant system 130 by double tapping the RFID tag 110.

Similarly, various embodiments involve multiple contactless-enabled devices 120 each tapping the check presenter having the RFID tag 110, where the RFID tag is a passive tag. With the passive tag, multiple contactless-enabled devices 120 may individually interrogate and read the passive tag. The contactless-enabled devices 120 may then interact with the payment network 150 to coordinate payment of the total bill using multiple funding sources. In various embodiments, each of the multiple contactless-enabled devices 120 provide notice to the payment network 150 that at least partial payment will be provide from a financial account associated with each of the multiple contactless-enabled devices 120.

Furthermore, the total bill may be divided using profile information about each consumer, randomly generated amounts, alternating amounts (e.g., different person pays a different percentage each time they attend the particular restaurant or a different restaurant with a similar group of people), escalating amounts, decreasing amounts, by a formula, by rules, etc. In various embodiments, the total bill may be divided equally amongst the number of payors or a specific amount to each payor (step 502). If the total bill is divided equally, each payor using their individual contactless-enabled devices 120 to submit a payment request using the provided information, namely the payor's equal share of the total bill and a merchant identifier (step 503). If the total bill is divided by specific amounts to each payor, the division may take place at one or more contactless-enabled devices 120 or the payment website. Allocation of the total bill among multiple devices may occur by each payor inputting a desired transaction amount before submitting the transaction request (step 505). Alternatively, allocation of the total bill among multiple devices may occur based on a division of an itemized purchase list (step 506). The payment website then tallies the submitted transaction amounts and compares to the total bill (step 507). If the total submitted transaction amount is greater than the total bill, then a notice of satisfactory payment is transmitted to the merchant system and/or the multiple contactless-enabled devices 120 (step 508). If the total submitted transaction amount is less than the total bill, then a notice of the remaining amount is transmitted to the multiple contactless-enabled devices 120 (step 509). In another embodiment, one of the multiple contactless-enabled devices 120 is deemed a "main" device and the remaining devices are "secondary" devices. The main device is the organizer of the multiple contactless-enabled devices 120 and tracks the total transaction amount submitted. For example, the main device may show a total bill amount and then an updated amount as transaction amounts are submitted by individual secondary devices. In this way, the main device displays the remaining bill and can complete payment of the bill, even including a tip.

Figure 6:
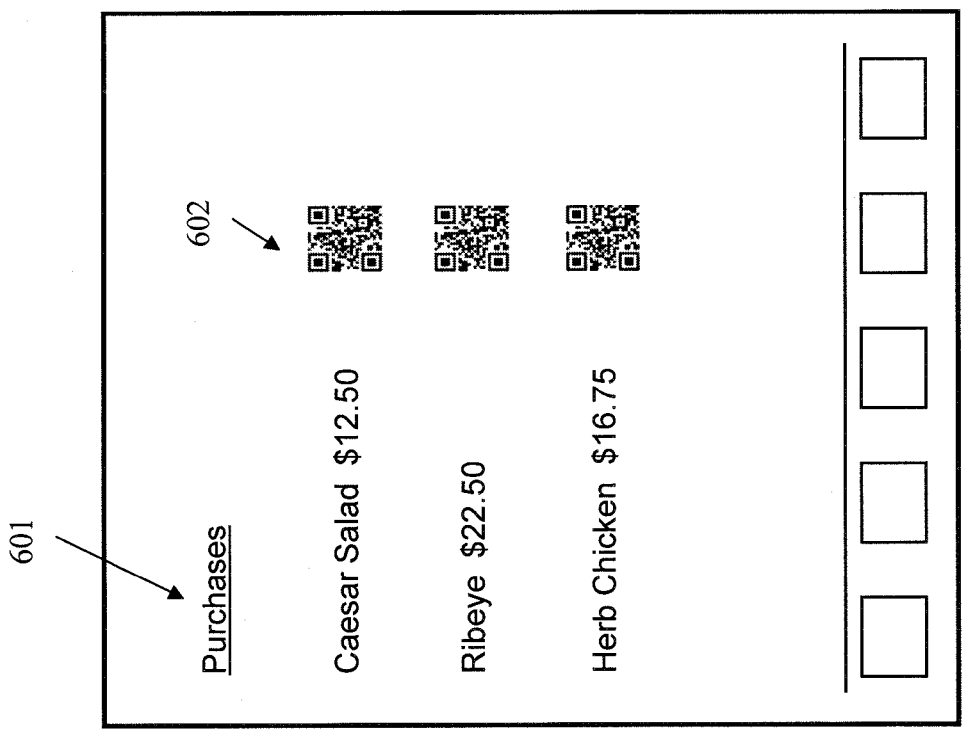
FIG. 6 illustrates an exemplary embodiment of facilitating itemized selection of purchases using QR codes.

In various exemplary embodiments and with reference to FIG. 6, QR codes are used to assist in dividing the total bill among multiple payors. In exemplary embodiments, individual QR codes are associated with purchases in an itemized list. For example, a first column 601 on the bill may list the items purchase and the price, while a second column 602 on the bill displays the corresponding QR code. Consumers can use their contactless-enabled devices 120 to read the QR codes of the items they are paying for and form their own individualized bill. In a similar embodiment, barcodes may be used in place of QR codes. Additionally, in various embodiments, the system may deactivate a given QR code if a consumer scans the QR code for an item for which they are paying. Deactivating the QR code eliminates double payment for an item associated with the give QR code.

In addition to using the contactless-enabled device 120 to access the network referenced by at least one of the RFID tag or QR code on the check presenter, the contactless-enabled device 120 may be used to write a review of the restaurant and the dining experience. For example, after submitting a payment request to the accessed network, an option to write a review may be presented to the contactless-enabled device 120. The consumer can select the option to write the review and provide comments and feedback.

Furthermore, in various embodiments, a consumer may be presented with various advertisements or offers. The advertisements may be specific post-dining options in the nearby area. For example, the consumer may receive, on the contactless-enabled device 120, a discount for movie tickets at a movie theatre located one mile from the restaurant. In other various embodiments, the consumer may receive, on the contactless-enabled device 120, notifications of events in the area. For example, the consumer may receive notification that a festival or sporting event is taking place in the area.

Furthermore, in various embodiments, the consumer may receive, on the contactless-enabled device 120, offers from the current merchant itself. For example, when paying a restaurant bill at a restaurant, the consumer may receive offers for use at the restaurant. The offer may be a discount on future visits or the like. If the check presenter includes a passive RFID tag, in various embodiments, the contactless-enabled device 120 may receive the offer from the payment network 150. If the check presenter includes an active RFID tag, in various embodiments, the contactless-enabled device 120 may receive the offer directly from the active RFID tag.

Figure 8:
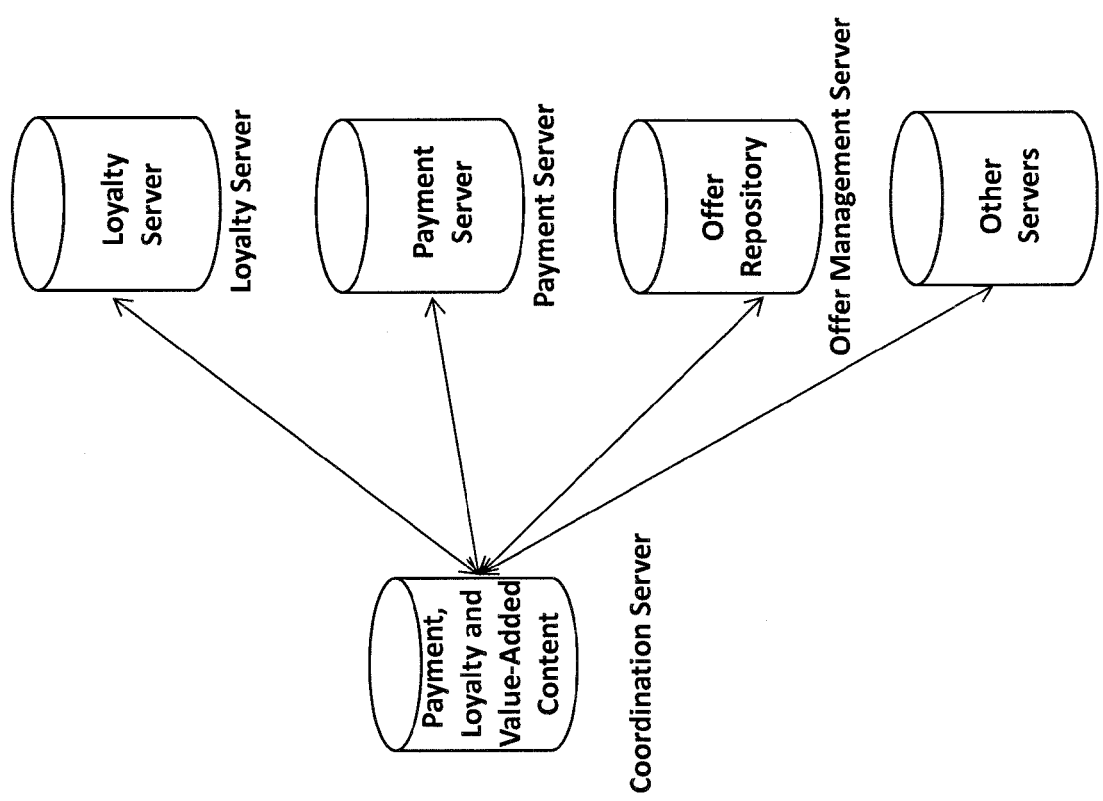
FIG. 8 illustrates an exemplary embodiment of a coordination server.

In various embodiments, and with reference to FIG. 8, a coordination server helps facilitate different processes of contactless restaurant transactions. The coordination server may be integrated into a merchant point-of-sale system (software and/or hardware) or the coordination server may be separate from the merchant point-of-sale system (software and/or hardware). A coordination server is a front-end component that may be configured to connect to multiple back-end components, depending on the system configuration. The various back-end components may include a loyalty server, a payment server, an offer management server, and other relevant back-end servers. In various embodiments, the coordination server communicates with a back-end server and provides merchant information, cardmember/customer information, payment information, or other various relevant information. In return, the various back-end servers may provide various information to the coordination server. The various information may include offers the cardmember/customer is eligible for, loyalty account information (e.g., loyalty discounts), cross-sell opportunities for other items at the merchant, cross-sell opportunities for other merchants the cardmember/customer may be interested in.

Figure 7:
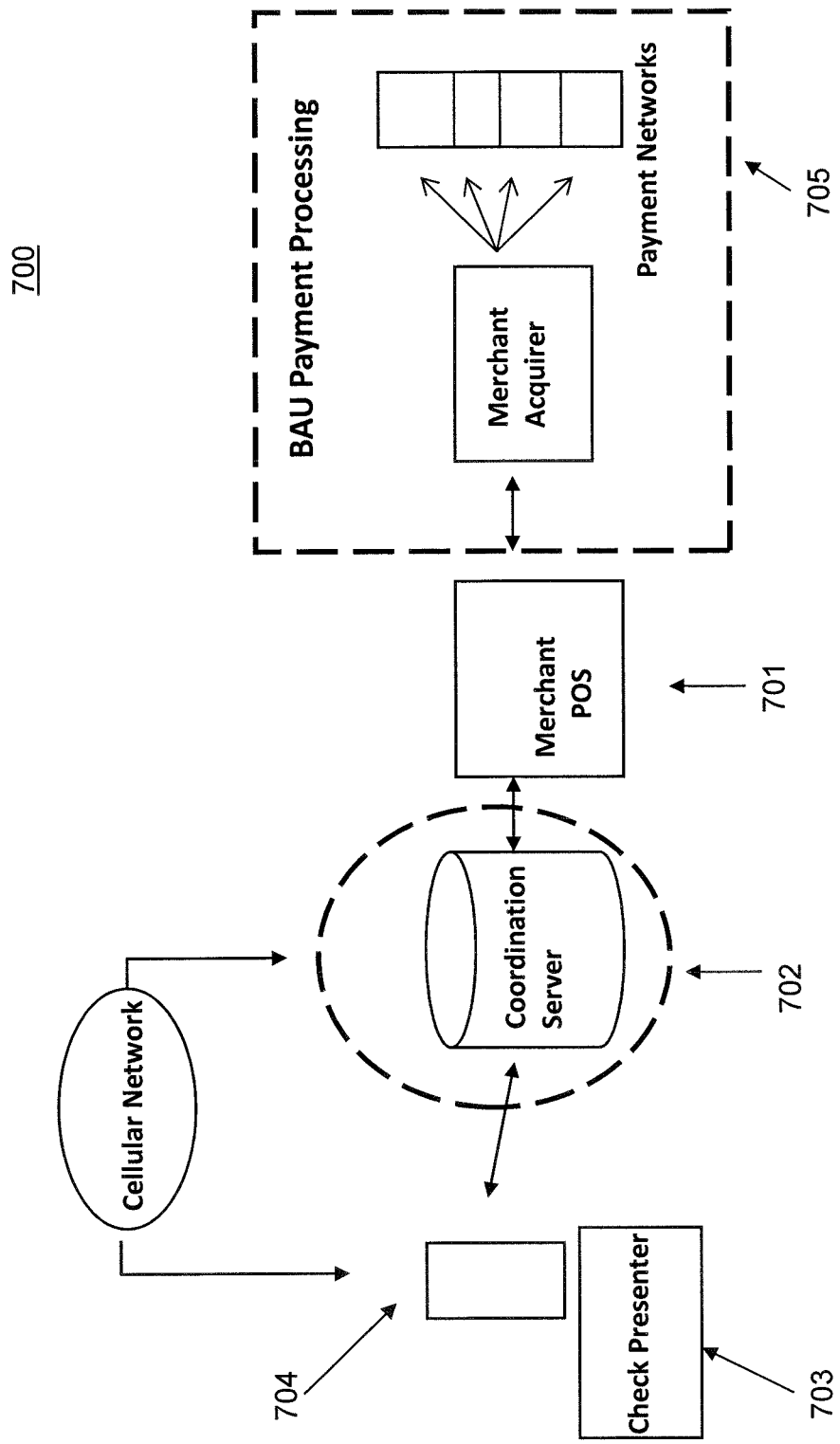
FIG. 7 is a flowchart illustrating an exemplary process of conducting contactless payments in a merchant transaction environment using a coordination server with payment processor.

In various embodiments, and with reference to FIG. 7, a contactless restaurant transaction system 700 comprises a merchant point-of-sale terminal 701, a coordination server 702, a check presenter 703, a contactless-enabled device 704, and a payment processor 705. The coordination server 702 may be integrated into merchant point-of-sale terminal 701. Similar to check presenter 110, check presenter 703 may also include an RFID tag. The RFID tag may be internal to check presenter 703 or may be removably coupled to check presenter 703. The RFID tag may be a passive tag which is activated by an interrogation signal from a reader, such as contactless-enabled device 704.

Once a customer at a restaurant indicates that he has decided to not order additional items, the restaurant check is closed and a total bill is tallied at merchant point-of-sale terminal 701. In various embodiments, merchant point-of-sale terminal 701 passes total bill information to coordination server 702. The total bill information may include a monetary value and an itemized list of purchases and corresponding cost. At coordination server 702, the total bill information is associated with an identifier of the RFID tag of check presenter 703. In various embodiments, a record of the total bill and related information is stored at coordination server 702, along with the associated RFID tag identifier. The check presenter is given to the consumer, who has multiple options to pay the total bill. The options include cash, check, providing a transaction account code, or submitting payment using a contactless-enabled device 704.

With continued reference to FIG. 7, in order to submit payment using the contactless-enabled device, the consumer may provide account information by "tapping" the contactless-enabled device 704 with check presenter having the RFID tag 703. As previously described, the "tapping" motion includes placing the contactless-enabled device 704 in close proximity to the RFID tag in order for an RF transponder of the contactless-enabled device 704 to communicate with the RFID tag and receive the RFID tag's unique identifier and a link to coordination server 702. In various embodiments, the contactless-enabled device 704 connects to coordination server 702 using the received link via a cellular or wireless network.

In various embodiments, the contactless-enabled device 704 transmits payment information and an RFID tag's unique identifier to coordination server 702. The unique identifier is used as a key to locate the customer's total bill. In response to the total bill being retrieved, coordination server 702 transmits, to merchant point-of-sale terminal 701, the total bill and payment information. In response to the merchant point-of-sale terminal 701 receiving the total bill and payment information, a payment authorization request is processed under business as usual standards to the appropriate payment network for authorization. In general, business as usual standards includes transmitting the payment authorization request to payment processor 705. Payment processor 705 may include a merchant acquirer in communication with multiple payment networks. The merchant acquirer facilitates transmitting the total bill and payment information to an appropriate payment network for authorization. Stated another way, the merchant acquirer performs payment routing on behalf of the merchant. The appropriate payment network depends on the payment information provided by the customer and may be any financial transaction institution, such as a bank, American Express®, Mastercard®, Visa®, or Discover®.

In response to payment authorization, merchant point-of-sale terminal 701 receives, from the payment network, notification of the authorization and passes the notification to coordination server 702. In various embodiments, coordination server 702 transmits confirmation of payment to contactless-enabled device 704 via the cellular or wireless network.

In various embodiments, communications take place between the contactless-enabled device 704 and coordination server 702. In addition to transmitting payment information and RFID tag's unique identifier from the contactless-enabled device 704 to coordination server 702, other information may be communicated. For example, a customer may revise the total bill amount to include a tip amount before requesting payment authorization. In one embodiment, a customer may apply a discount code or rewards points to the total bill. The discount code or rewards points application is communicated to coordination server 702, where the total bill value is adjusted accordingly.

Furthermore, the total bill may be paid using one or more funding sources. In various embodiments, contactless-enabled device 704 may contain account information for more than one funding source. A customer may select one of the funding sources to be used to complete the transaction. In various embodiments, multiple funding sources may be used to complete the transaction. The multiple funding sources may be owned by a single owner or may be owned by multiple owners. In various embodiments involving multiple funding sources and multiple owners, the transaction may be completed similar to the process described with respect to FIG. 5. Moreover, multiple funding sources may be used to facilitate a payment transaction in similarly related systems described herein.

Figure 9:
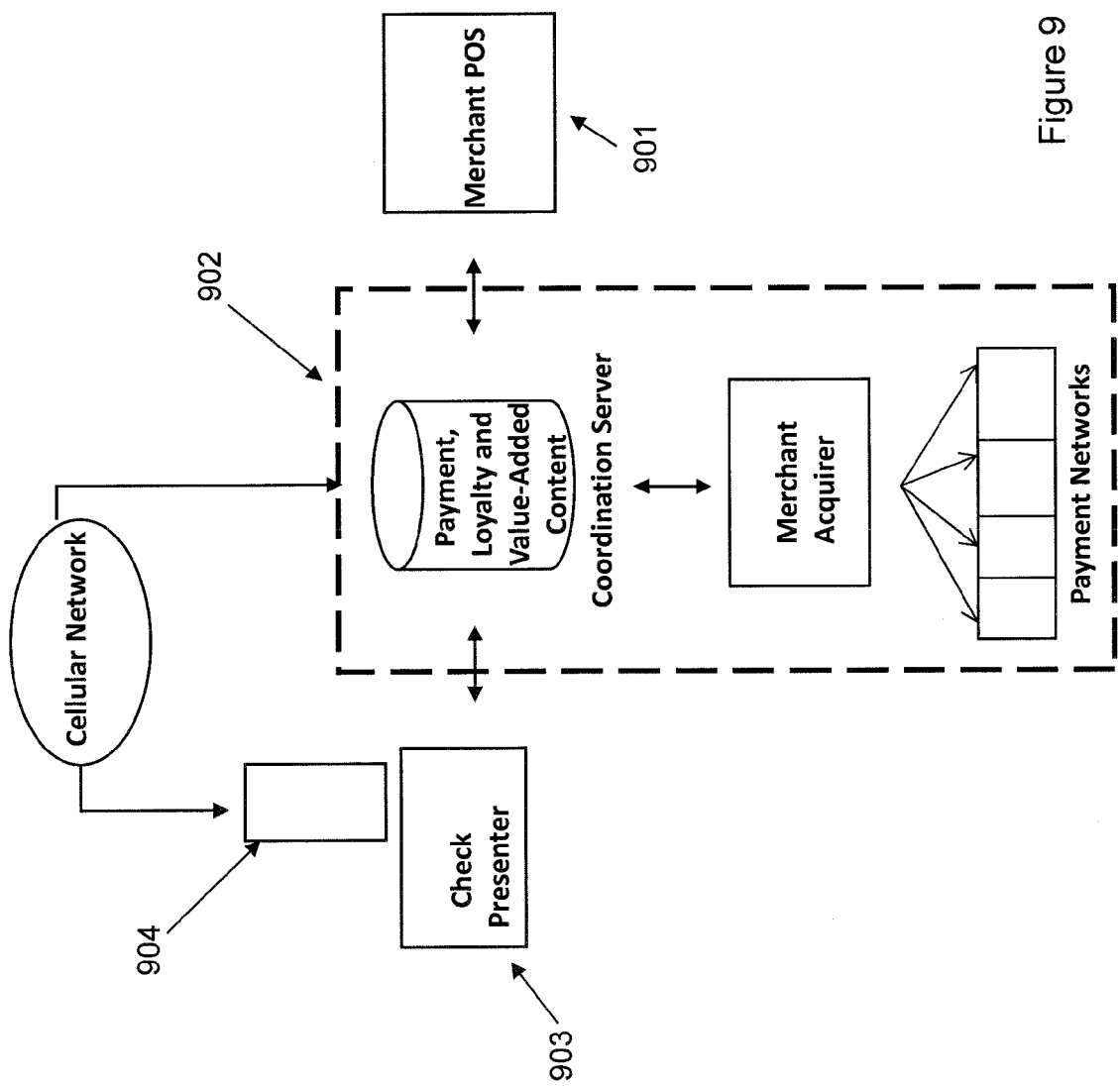
FIG. 9 is a flowchart illustrating an exemplary process of conducting contactless payments in a merchant transaction environment using a coordination server.

In various embodiments, and with reference to FIG. 9, a contactless restaurant transaction system 900 may comprise a merchant point-of-sale terminal 901, a stand-alone coordination server 902, a check presenter 903, and a contactless-enabled device 904. Similar to check presenter 703, check presenter 903 comprises an RFID tag. Further, contactless restaurant transaction system 900 is similar to contactless restaurant transaction system 700, except that the coordination server 902 provides a turn-key payment solution to the merchant. In various embodiments, coordination server 902 is separate from merchant point-of-sale terminal 901 and includes specific software and hardware.

Certain differences between coordination server 702 and coordination server 902 occur after receiving RFID tag's unique identifier and payment information from contactless enabled device 904. The unique identifier is used as a key to locate the customer's total bill. In response to the total bill being retrieved, coordination server 902 transmits the total bill and payment information to a merchant acquirer. The merchant acquirer facilitates transmitting the total bill and payment information to an appropriate payment network for authorization. Stated another way, the merchant acquirer performs payment routing on behalf of the merchant. The appropriate payment network depends on the payment information provided by the customer and may be any financial transaction institution, such as a bank, American Express®, Mastercard®, Visa®, or Discover®.

In response to payment authorization, coordination server 902 receives, from the payment network, notification of the authorization and passes the notification to merchant point-of-sale terminal 901. In various embodiments, coordination server 902 transmits confirmation of payment to contactless-enabled device 904 via a cellular or wireless network.

Figure 10:
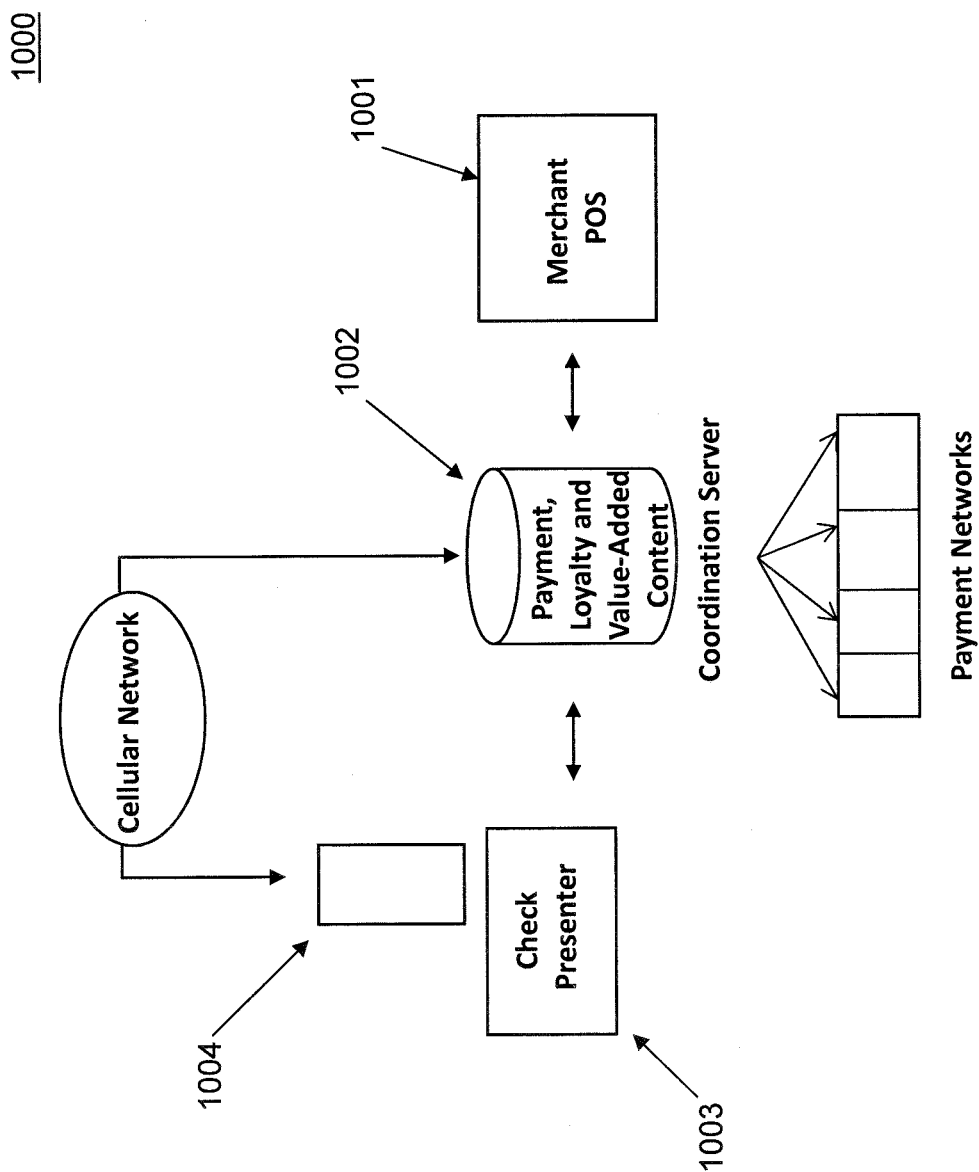
FIG. 10 is a flowchart illustrating an exemplary process of conducting contactless payments in a merchant transaction environment using a coordination server for routing payment.

In various embodiments, and with reference to FIG. 10, a contactless restaurant transaction system 1000 may comprise a merchant point-of-sale terminal 1001, a stand-alone coordination server 1002, a check presenter 1003, and a contactless-enabled device 1004. Similar to check presenter 1003, check presenter 1003 comprises an RFID tag. Further, contactless restaurant transaction system 1000 is similar to contactless restaurant transaction system 700, except that the coordination server 1002 provides a turn-key payment solution to the merchant. In various embodiments, coordination server 1002 is separate from merchant point-of-sale terminal 1001 and includes specific software and hardware.

Certain differences between coordination server 702 and coordination server 1002 occur after receiving RFID tag's unique identifier and payment information from contactless enabled device 1004. The unique identifier is used as a key to locate the customer's total bill. In response to the total bill being retrieved, coordination server 1002 transmits the total bill and payment information (e.g., directly) to the appropriate payment network for authorization. The appropriate payment network depends on the payment information provided by the customer and may be any financial transaction institution, such as a bank, American Express®, Mastercard®, Visa®, or Discover®.

In response to payment authorization, coordination server 1002 receives, from the payment network, notification of the authorization and passes the notification to merchant point-of-sale terminal 1001. In various embodiments, coordination server 1002 transmits confirmation of payment to contactless-enabled device 1004 via a cellular or wireless network.

Figure 11:
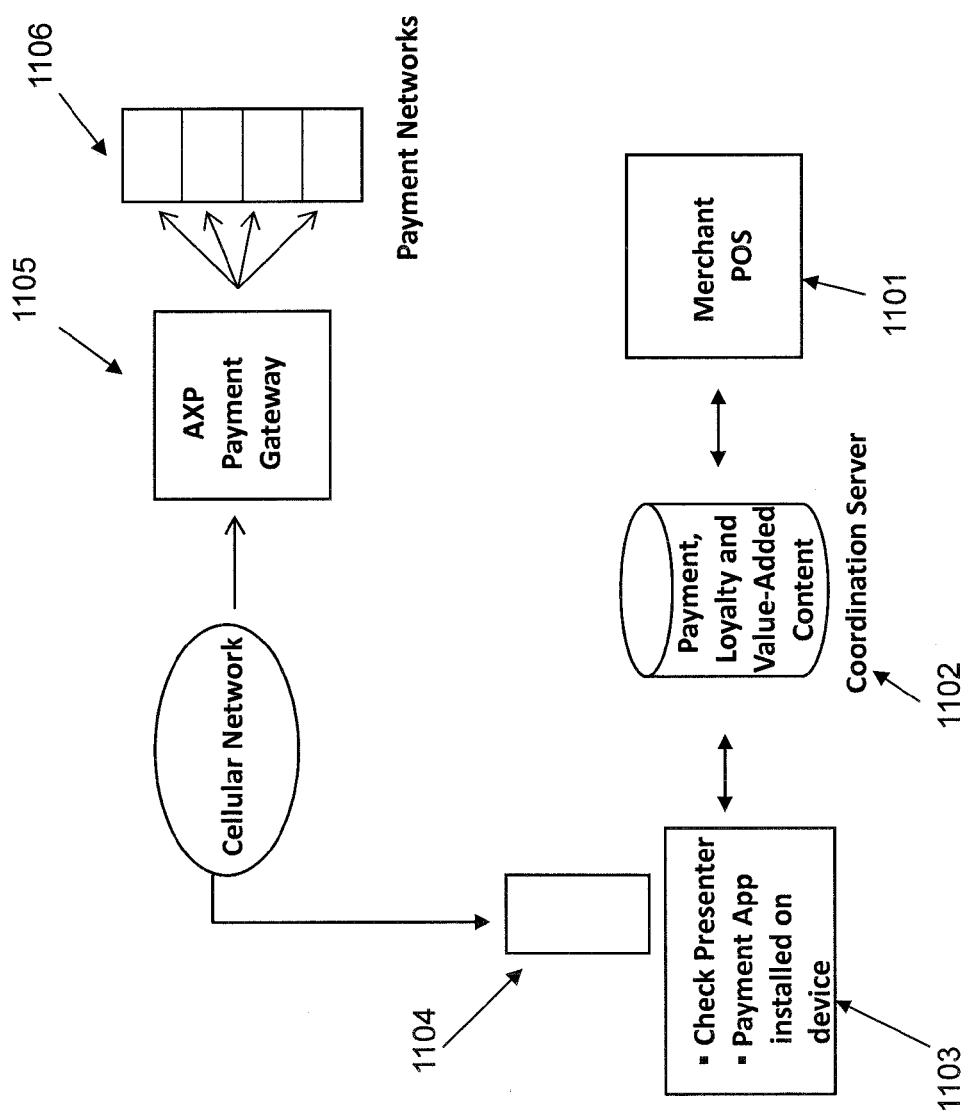
FIG. 11 is a flowchart illustrating an exemplary process of conducting contactless payments in a merchant transaction environment using a payment gateway.

In various embodiments, and with reference to FIG. 11, a contactless restaurant transaction system 1100 may comprise a merchant point-of-sale terminal 1101, a coordination server 1102, a check presenter 1103, a contactless-enabled device 1104, and a payment processor 1105 in communication with multiple payment networks 1106. The coordination server 1102 may be integrated into merchant point-of-sale terminal 1101. Similar to check presenter 1003, check presenter 1103 also includes an RFID tag having a unique identifier. Further, contactless restaurant transaction system 1100 is similar to contactless restaurant transaction system 1000, except that the contactless-enabled device 1104 communicates directly with payment processor 1105 via a cellular or wireless network.

In various embodiments, contactless-enabled device 1104 includes an installed payment application. Contactless-enabled device 1104 receives a total bill generated from merchant point-of-sale 1101. In various embodiments, the total bill may be communicated to contactless-enabled device 1104 from coordination server 1102 and/or the RFID tag of check presenter 1103 if the RFID tag is an active tag. To facilitate payment of the total bill, contactless-enabled device 1104 transmits the total bill and payment information, via a cellular or wireless network, to payment processor 1105.

In various embodiments, payment processor 1105 is a payment gateway in communication with multiple payment networks 1106. The payment gateway transmits the total bill and payment information to the appropriate payment network of multiple payment networks 1106 for authorization. The appropriate payment network depends on the payment information provided by the customer and may be any financial transaction institution, such as a bank, American Express®, Mastercard®, Visa®, or Discover®.

Typically, a check presenter is a small black bi-fold holder, which includes an RFID tag. The RFID tag is generally a passive tag that is powered by a nearby reader, such as a contactless-enabled device. In various embodiments, a check presenter may be a tablet computer operated primary by a touch screen, such as an iPad. A check presenter tablet computer may be used in any of the various embodiments described herein. The advantage of the check presenter tablet computer is that the tablet computer may be configured to actively communicate with a coordination server or payment processor. In other words, instead of a contactless-enabled device performing the communications with a coordination server via a cellular or wireless network, the check presenter tablet computer provides the same or similar functionality.

Figure 12:
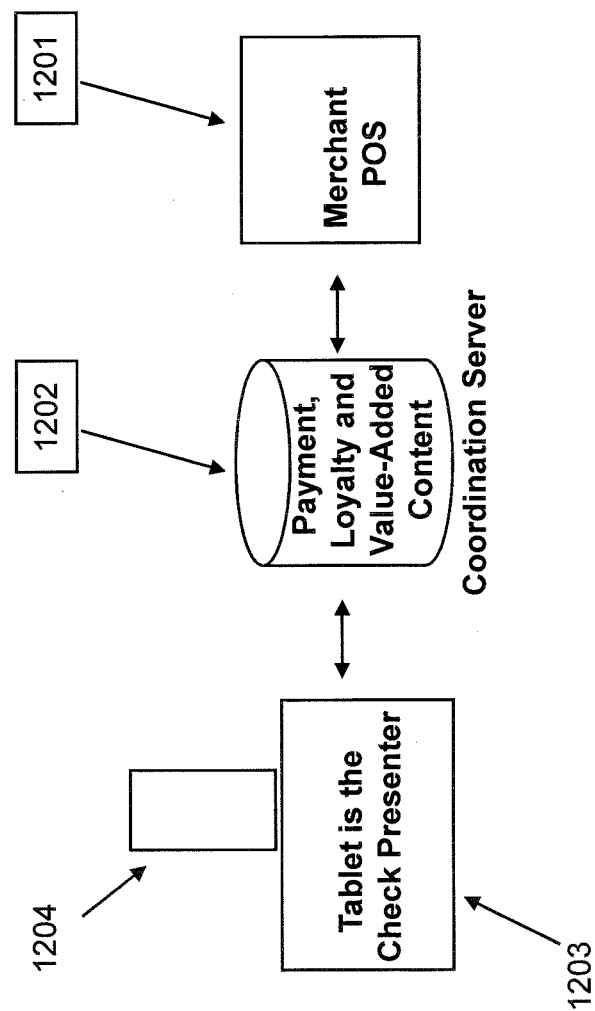
FIG. 12 is a flowchart illustrating an exemplary process of conducting contactless payments in a merchant transaction environment using a tablet computer.

In various embodiments, and with reference to FIG. 12, a contactless restaurant transaction system 1200 may comprise a merchant point-of-sale terminal 1201, a coordination server 1202, a check presenter tablet computer 1203, and a contactless-enabled device 1204. Similar to the previously described embodiments, a total bill is generated at merchant point-of-sale terminal 1201 and passed to coordination server 1202. The coordination server 1202 associates the total bill with a unique identifier of check presenter tablet computer 1203. Additionally, in various embodiments, the total bill and related data, such as a merchant identifier, is loaded onto check presenter tablet computer 1203.

According to various embodiments, check presenter tablet computer 1203 communicates with contactless-enabled device 1204 to obtain payment information. Check presenter tablet computer 1203 may be configured to complete the transaction in similar manner to previously described restaurant transaction systems 700, 900, 1000, 1100, except that check presenter tablet computer 1203 transmits the total bill and payment information.

Figure 13:
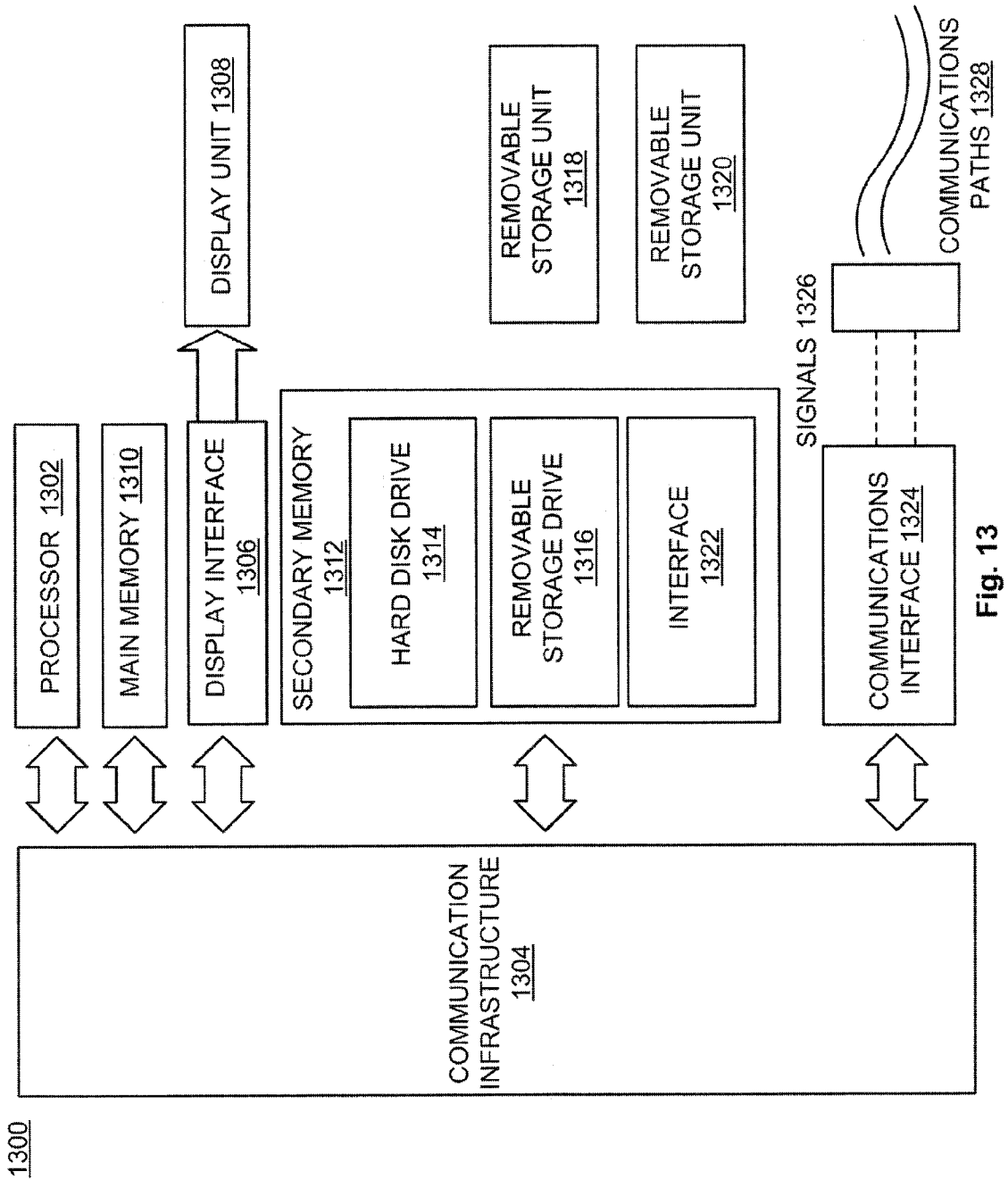
FIG. 13 is a block diagram of an exemplary embodiment of a computer system.

With reference to FIG. 13, computer system 1300 includes at least one processor, such as a processor 1302. Processor 1302 is connected to a communication infrastructure 1304, for example, a communications bus, a cross over bar, a network, and/or the like. Various software embodiments are described in terms of this exemplary computer system 1300. After reading this description, it will become apparent to a person skilled in the relevant art(s) how to implement the present embodiments using other computer systems and/or architectures.

The computer system 1300 includes a display interface 1306 that forwards graphics, text, and other data from the communication infrastructure 1304 for display on a display unit 1308.

The computer system 1300 further includes a main memory 1310, such as random access memory (RAM), and may also include a secondary memory 1312. The secondary memory 1312 may further include, for example, a hard disk drive 1314 and/or a removable storage drive 1316, representing a floppy disk drive, a magnetic tape drive, an optical disk drive, etc. The removable storage drive 1316 reads from and/or writes to a removable storage unit 1318 in a well known manner. The removable storage unit 1318 may represent a floppy disk, magnetic tape or an optical disk, and may be read by and written to by the removable storage drive 1316. As will be appreciated, the removable storage unit 1318 includes a computer usable storage medium having stored therein, computer software and/or data.

In accordance with various embodiments, the secondary memory 1312 may include other similar devices for allowing computer programs or other instructions to be loaded into the computer system 1300. Such devices may include, for example, a removable storage unit 1320, and an interface 1322. Examples of such may include a program cartridge and cartridge interface (such as that found in video game devices), a removable memory chip (such as an erasable programmable read only memory (EPROM), or programmable read only memory (PROM)) and associated socket, and other removable storage unit 1320 and interfaces 1322, which allow software and data to be transferred from the removable storage unit 1320 to the computer system 1300.

The computer system 1300 may further include a communication interface 1324. The communication interface 1324 allows software and data to be transferred between the computer system 1300 and external devices. Examples of the communication interface 1324 include, but may not be limited to a modem, a network interface (such as an Ethernet card), a communications port, a Personal Computer Memory Card International Association (PCMCIA) slot and card, and/or the like. Software and data transferred via the communication interface 1324 are in the form of a plurality of signals, hereinafter referred to as signals 1326, which may be electronic, electromagnetic, optical or other signals capable of being received by the communication interface 1324. Signals 1326 are provided to the communication interface 1324 via a communication path (e.g., channel) 1328. The communication path 1328 carries the signals 1326 and may be implemented using wire or cable, fiber optics, a telephone line, a cellular link, a radio frequency (RF) link and other communication channels.

In this document, the terms "computer program medium" and "computer usable medium" are used to generally refer to media such as the removable storage drive 1316, a hard disk installed in hard disk drive 1314, signals 1326, and/or the like. These computer program products provide software to the computer system 1300. The present disclosure is directed to such computer program products.

Computer programs (also referred to as computer control logic) are stored in the main memory 1310 and/or the secondary memory 1312. Computer programs may also be received via the communication infrastructure 1304. Such computer programs, when executed, enable the computer system 1300 to perform the features as discussed herein. In particular, the computer programs, when executed, enable the processor 1302 to perform the features of the various embodiments. Accordingly, such computer programs represent controllers of the computer system 1300.

In accordance with an embodiment implemented using a software, the software may be stored in a computer program product and loaded into the computer system 1300 using the removable storage drive 1316, the hard disk drive 1314 or the communication interface 1324. The control logic (software), when executed by the processor 1302, causes the processor 1302 to perform the functions as described herein.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers. A user may include any individual, business, entity, government organization, software and/or hardware that interact with a system.

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, hand held computers, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network. A web-client may run Microsoft Internet Explorer, Mozilla Firefox, Google Chrome, Apple Safari, or any other of the myriad software packages available for browsing the interne.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

As those skilled in the art will appreciate, a web client includes an operating system (e.g., Windows NT, 95/98/2000/CE/Mobile, OS2, UNIX, Linux, Solaris, MacOS, PalmOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In an exemplary embodiment, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In an embodiment, various components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); Java 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

"Entity" may include any individual, consumer, consumer, group, business, organization, government entity, transaction account issuer or processor (e.g., credit, charge, etc), merchant, consortium of merchants, consumer, account holder, charitable organization, software, hardware, and/or any other entity.

A "transaction account" may include any account that may be used to facilitate a financial transaction. A financial institution or transaction account issuer includes any entity that offers transaction account services to consumers. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution, but these participants are not shown.

The transaction account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution. The financial institution may include any entity which processes transactions, issues accounts, acquires financial information, settles accounts, conducts dispute resolution regarding accounts, and/or the like.

The term "merchant" shall include any person, entity, charitable organization, machine, software, hardware, and/or the like that that offers a product or service to a consumer. As used herein, the term "merchant" is used interchangeably with the term "retailer," "supplier" or "seller". Moreover, in this context, a merchant may offer or sell, either online or offline, products and/or services made or supplied by at least one manufacturer. As used herein, the phrases "network level" and "network-wide level" shall refer to a system that includes more than one merchant and at least one manufacturer. The merchant's computer system may also be interconnected to a third-party provider via a second network, referred to as a payment network. The payment network represents existing proprietary networks that presently accommodate transactions for credit cards, debit cards, and other types of financial instruments or banking cards. The payment network is a closed network that is assumed to be secure from eavesdroppers. Examples of the payment network include the American Express®, VisaNet®, and the Veriphone® networks.

As used herein, the terms "consumer", "consumer", "purchaser", and "end-user" may be used interchangeably with each other, and each shall mean any person, entity, charitable organization, or business which uses a consumer ID to participate in the present system. A "consumer ID", as used herein, includes any device, code, or other identifier suitably configured to allow the consumer to interact or communicate with the system, such as, for example, a rewards card, charge card, credit card, debit card, prepaid card, telephone card, smart card, magnetic stripe card, bar code card, authorization/access code, personal identification number (PIN), Internet code, other identification code, and/or the like. Additionally, a "consumer ID" may comprise any form of electronic, magnetic, and/or optical device capable of transmitting or downloading data from itself to a second device which is capable of interacting and communicating with such forms of consumer ID.

"Transaction data", as used herein, comprises data relating to the offer of any item to a consumer or other end-user. Purchase data may include any of the following: an item purchased, an item price, a number of items purchased, a total transaction price, a payment vehicle, a date, a store identifier, an employee identifier, a retailer item identifier, a loyalty identifier, and/or the like.

In various embodiments, the present disclosure is implemented primarily in hardware using, for example, hardware components such as application specific integrated circuits (ASIC). Implementation of the hardware state machine so as to perform the functions described herein will be apparent to persons skilled in the relevant art(s).

In yet another embodiment, the present disclosure is implemented using a combination of both the hardware and the software.

Systems, methods and computer program products are provided. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

While various embodiments of the present disclosure have been described above, it should be understood that they have been presented by way of example, and not limitation. It will be apparent to persons skilled in the relevant art(s) that various changes in form and detail can be made therein without departing from the spirit and scope of the present disclosure. Thus, the present disclosure should not be limited by any of the above described exemplary embodiments, but should be defined only in accordance with the following claims and their equivalents.

In addition, it should be understood that the figures illustrated in the attachments, which highlight the functionality and advantages of the present disclosure, are presented for example purposes only. The architecture of the present disclosure is sufficiently flexible and configurable, such that it may be utilized (and navigated) in ways other than that shown in the accompanying figures. The detailed description of exemplary embodiments herein makes reference to the accompanying drawings and figures, which show the exemplary embodiments by way of illustration only. While these exemplary embodiments are described in sufficient detail to enable those skilled in the art, it should be understood that other embodiments may be realized and that logical electrical, organization, and programming-related changes may be made without departing from the spirit and scope of the disclosure. It will be apparent to a person skilled in the pertinent art that this disclosure can also be employed in a variety of other applications. Thus, the detailed description herein is presented for purposes of illustration only and not of limitation. For example, the steps recited in any of the method or process descriptions may be executed in any order.

The present disclosure is described herein with reference to block diagrams and flowchart illustrations of methods, and computer program products according to various aspects of the disclosure. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the disclosure. It should be understood that the detailed description and specific examples, indicating exemplary embodiments of the system, are given for purposes of illustration only and not as limitations. Many changes and modifications within the scope of the instant disclosure may be made without departing from the spirit thereof, and the disclosure includes all such modifications. Corresponding structures, materials, acts, and equivalents of all elements in the claims below are intended to include any structure, material, or acts for performing the functions in combination with other claim elements as specifically claimed. The scope of the disclosure should be determined by the appended claims and their legal equivalents, rather than by the examples given above. Reference to an element in the singular is not intended to mean "one and only one" unless explicitly so stated, but rather "one or more." Moreover, where a phrase similar to at least one of A, B, and C is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The invention claimed is:

1. A method, comprising:
   associating, by a computer system, transaction data with an identifier of a radio frequency identification (RFID) tag, wherein the transaction data is usable to generate a payment authorization request for a transaction with a consumer, and wherein the identifier is accessible via a mobile device of the consumer;
   receiving, by the computer system, the identifier of the RFID tag and payment data of the consumer from the mobile device;
   sending, by the computer system, the payment data and transaction data to a merchant acquirer, wherein the merchant acquirer is configured to generate the payment authorization request for the transaction based on the payment data and transaction data and
   receiving, by the computer system from the merchant acquirer, a notification that payment of the transaction is authorized.

2. The method of claim 1, wherein the transaction data includes a summary of transactions.

3. The method of claim 1, wherein the transaction data is received from a merchant.

4. The method of claim 1, wherein the transaction data is received from a merchant point-of-sale terminal.

5. The method of claim 1, wherein the radio frequency identification tag is included in a check presenter.

6. The method of claim 1, further comprising:
   notifying, by the computer system, a merchant that the payment of the transaction is authorized.

7. The method of claim 1, further comprising:
   notifying, by the computer system, the consumer that payment of the transaction data is authorized.

8. The method of claim 1, wherein the computer system is in communication with a plurality of back-end servers, and wherein the plurality of back-end servers includes at least one of a loyalty server, a payment server, and an offer management server.

9. The method of claim 1, wherein the computer system is integrated into a merchant point-of-sale terminal.

10. The method of claim 1, wherein the computer system is separate from a merchant point-of-sale terminal.

11. The method of claim 1, wherein the computer system sends the payment data and transaction data to a merchant acquirer via a merchant point-of-sale terminal.

12. The method of claim 11, wherein the merchant acquirer is configured to route a payment request to an appropriate payment network selected based on payment information from the consumer.

13. A computer system, comprising:
   one or more processors;
   memory having instructions stored therein that, in response to execution by the one or more processors, cause the computer system to perform operations including:
      receiving, from a merchant system, transaction data associated with an identifier of a radio frequency identification (RFID) tag, wherein the transaction data is usable to authorize a transaction with a consumer;
      receiving, from a mobile device associated with the consumer, the identifier of the RFID tag-and payment information of a consumer;
      locating the transaction data using the identifier as a key; and
      transmitting the located transaction data and payment information to a merchant acquirer configured to generate a payment authorization request for the transaction.

14. The computer system of claim 13, wherein the transaction data includes a summary of transactions.

15. The computer system of claim 13, wherein the radio frequency identification tag is embedded in a check presenter.

16. A method, comprising:
   a mobile device reading an identifier from a radio frequency identification (RFID) tag associated with a transaction between a merchant and a user of the mobile device;
   the mobile device sending the read identifier and a payment information for the transaction to a coordination system, wherein the coordination system is configured to use the identifier to retrieve transaction information received from a computer system of the merchant, and wherein the coordination system is configured to send the transaction information and payment information to a merchant acquirer configured to generate a transaction request for the transaction; and
   the mobile device receiving a notification that the transaction request has been approved by an authorization system.

* * * * *